June 3, 1958   N. V. BEAMAN   2,837,356
SANITARY STUFFING BOX

Filed Sept. 15, 1955   2 Sheets-Sheet 1

INVENTOR.
Norman V. Beaman.
BY
Wood, Herron & Evans.
ATTORNEYS.

June 3, 1958    N. V. BEAMAN    2,837,356
SANITARY STUFFING BOX

Filed Sept. 15, 1955    2 Sheets-Sheet 2

INVENTOR.
Norman V. Beaman.
BY Wood, Herron & Evans
ATTORNEYS.

United States Patent Office 2,837,356
Patented June 3, 1958

2,837,356

SANITARY STUFFING BOX

Norman V. Beaman, Cheviot, Ohio, assignor to The J. H. Day Company, Inc., Cincinnati, Ohio, a corporation of Ohio Application September 15, 1955, Serial No. 534,544

6 Claims. (Cl. 286—7)

The present invention relates to sealing means for providing a fluid tight seal between a rotating shaft and a wall in a food processing device such as a dough mixer, pump or the like.

The seal of the present invention will be discussed primarily in connection with a dough mixer, although it will be understood that the seal can advantageously be applied in other types of food handling equipment such as pumps in which it is desirable to provide a sanitary seal between a rotating shaft and a wall of the machine housing.

A dough mixer of the type to which the present invention relates includes a bowl, or tank, adapted to hold the dough being mixed and an agitator mounted for rotary movement within the tank. The shaft carrying the agitator passes through openings in the two end walls of the tank and stuffing boxes are provided in these openings for sealing the mixing bowl against leakage through the openings along the agitator shaft.

The provision of a satisfactory seal in food processing equipment, such as a mixer, is made especially difficult because of the nature of the material being handled which renders it readily succeptible to contamination. In order to prevent such contamination very stringent standards have been promulgated concerning the cleansing of food processing equipment. For example, the city of New York requires that a dough mixer be thoroughly cleaned after each use. Such a thorough cleansing includes the removal of deposited food particles from the stuffing box, ends of the agitator, the agitator shaft, the end wall openings, and surrounding wall portions of the mixing bowl.

The principal object of the present invention is to provide a seal which is adapted to be readily removed from the wall of the mixer so that the component parts of the stuffing box can readily be cleaned and an operator can easily reach through the end wall opening to thoroughly clean the adjacent areas of the wall, agitator shaft and agitator proper.

More particularly, a preferred form of seal constructed in accordance with the present invention comprises an annular gland adapted to reside within an end wall opening of the mixer surrounding the agitator shaft. Suitable gasket means such as an O ring are compressed between the gland and the edge of the wall opening to provide a seal between the gland and wall. The inner surface of the gland is finished to provide a bearing face adapted tfor cooperative engagement with a similar bearing face formed on the outer end of the agitator or on some other plate rotatable with the shaft and sealed relative thereto.

The gland is held stationary in the end wall opening and is forced inwardly into sealing engagement with the rotating bearing surface on the agitator shaft by means of a yoke assembly having two arms carrying inwardly extending fingers adapted for engagement with diametrically opposed points on the gland. The yoke also includes an outwardly extending mounting leg. This mounting leg engages a bracket fixed to the end wall of the mixer bowl and in addition carries a leaf spring which is forced away from the wall of the mixer bowl by a bolt in engagement with the spring and in abutting relationship with the mixer wall. When the spring is forced outwardly the yoke pivots about its points of engagement with the mounting bracket causing the ends of the yoke arms and fingers in engagement with the gland to be forced inwardly applying an axial thrust to the gland.

The yoke can be removed from the bracket and from engagement with the gland and mixer wall by simply pulling on a suitable handle which disengages the yoke from the bracket and enables it to be lifted completely free from the mixer. The gland can then be shifted outwardly along the agitator shaft to a cleaning position spaced a substantial distance from the agitator wall. In this position the gland and agitator shaft can readily be cleaned by an operator who can also insert his hand through the opening in the end wall of the mixer bowl to clean the inner end of the agitator shaft, the agitator and adjacent areas of the mixer wall.

One of the principal advantages of the present stuffing box is that it can be removed and replaced in a minimum amount of time without the use of any tools. This is of special importance in bakeries and similar plants where the machine operators frequently have only a very limited amount of mechanical experience. In the past it has been observed that in the absence of extremely close supervision operators are prone to clean only the parts of a mixer which are readily accessible, while neglecting the areas adjacent the agitator shaft and wall which are harder to reach. The present stuffing box which can quickly and easily be removed and replaced without any tools renders all parts of the mixer readily accessible and thereby greatly facilitates the cleaning of the mixer making it much more probable that an operator will completely clean the apparatus when required.

Another advantage of the present invention is that an extremely effective seal is provided, preventing any leakage of material along the agitator shaft. This feature is also extremely important in the food processing industry in which ingredients such as salt used in the material being processed are extremely corrosive and are apt to injure the agitator shaft and bearings.

As explained in greater detail in conjunction with the detailed description of the drawings, the yoke construction of the present seal is such that the seal is universally moveable relative to the agitator shaft and housing wall. Thus the stuffing box is effective to provide a fluid tight seal under all conditions of operation despite the presence of agitator shaft misalignment or a maximum deflection under maximum load or shock conditions.

A further advantage of the present sanitary stuffing box is that once the proper pressure adjustment has been made for the yoke spring so that the gland is forced inwardly with the proper amount of force to provide an effective seal, this adjustment need not be disturbed when the gland and yoke are removed or replaced during cleaning.

A still further object of the present stuffing box is that it is of extremely simple construction and is simple and economical to manufacture.

These and other objects and advantages of the present invention will be more readily apparent from a further consideration of the following detailed description of the drawings illustrating a preferred embodiment of the invention.

Figures 1, 2:
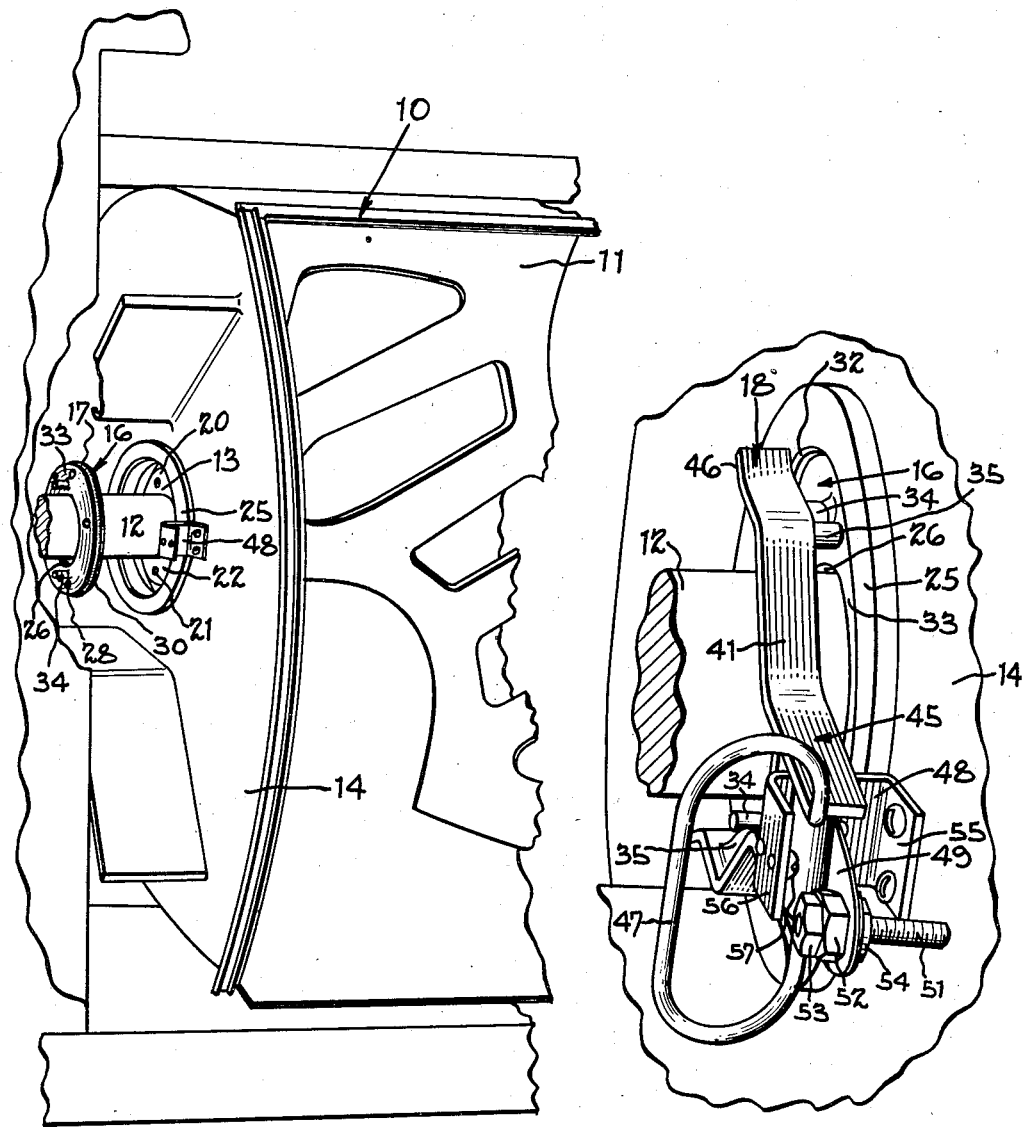
Figure 1 is a perspective view of one end of a dough mixer provided with a seal of the present invention, the seal being shown in a position removed from the mixer wall.
Figure 2 is an enlarged perspective view of a seal mounted in the end wall of the mixer.

Figure 1 shows a stuffing box of the present invention embodied in a dough mixing machine to provide a sanitary, readily removeable seal. It will be understood, however, that the present stuffing box can readily be employed with other types of food processing equipment including a rotatable shaft, such as pumps and the like. As shown in Figure 1, a dough mixer comprises a mixing bowl 10 enclosing an agitator 11 mounted upon shaft 12. The agitator shaft passes through enlarged openings 13 in end walls 14 of the mixer bowl and is journalled at its outer ends in suitable bearings provided in end frame members of the mixer (not shown).

A stuffing box assembly is provided to seal opening 13 in each end wall of the mixing bowl around agitator shaft 12 when the mixer is in operation so as to prevent leakage along the agitator shaft.

The stuffing box assembly comprises an annular gland, or sealing ring, 16 adapted for slidable insertion within end wall aperture 13, an O ring, or other suitable gasket element 17, adapted to provide a seal between the gland and wall 14, and a yoke 18 adapted to hold the gland in place, within wall opening 13. In addition to these members, an additional element of the seal is constituted by a rotatable abutment member 20, which in the embodiment shown is affixed as by means of bolts 21 to the end of agitator 11. Alternatively abutment plate 20 may be formed by a member spaced from agitator 11. In either case abutment plate 20 extends radially outwardly from shaft 12 so as to be in a plane disposed at right angles with the axis of rotation of the shaft, is rotatable with the shaft, and is sealed thereto so that fluid leakage between the shaft and opening 13 is prevented. The outwardly facing surface 22 of plate 20 is provided with a highly polished finish to adapt that surface for functioning as a bearing surface adapted to cooperate with the inner face 23 of gland 16.

Figure 3:
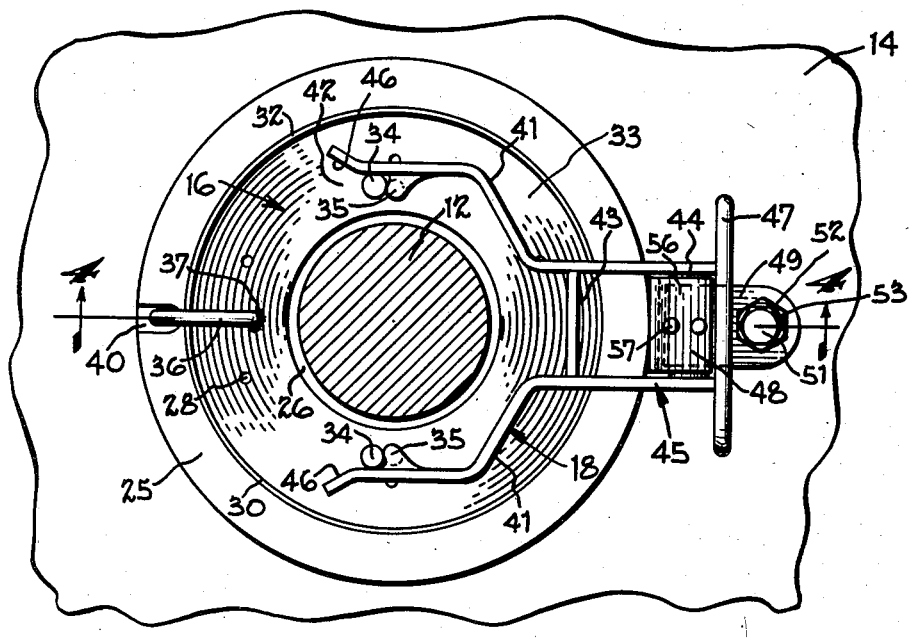
Figure 3 is a cross-sectional view through the agitator shaft looking toward the seal.

Gland 16 is annular in shape and is dimensioned slightly smaller than a ring 25 fitted in the periphery of opening 13 formed in end wall 14 of the mixer. Gland 16 also is provided with a central opening 26 adapted to receive agitator shaft 12; opening 26 is of substantially larger diameter than the diameter of shaft 12 so that when the gland is disposed in sealing position within aperture 13, the gland is spaced an appreciable distance from the periphery of shaft 12 as best shown in Figure 3. In the embodiment shown, gland 16 is formed of any suitable corrosion resistant material and includes an annular bearing ring 27 fitted in a recessed portion formed in the inner face of the gland. This ring is adapted for cooperative engagement with the bearing surface formed on abutment member 20. Ring 27 may be fitted within the recess in any suitable manner such as by means of bolts 28; or alternatively the entire gland 16 may be formed of a material having suitable bearing characteristics so that its inner surface may be highly polished, thereby eliminating the need of a separate bearing ring 27.

The periphery 30 of the gland is provided with a groove 31. This groove is adapted to receive gasket element 17 which in the preferred embodiment is constituted by an O ring adapted to snap in the groove. When the gland 16 is inserted within aperture 13, O ring 17 is compressed between peripheral groove 31 and the inner wall of ring 25. In order to facilitate insertion of the gland and O ring into the aperture of this member, the outer face of ring 25 is preferably beveled as at 32 (Figure 4).

The outer face 33 of gland 16 carries outwardly extending abutment members 34. These abutment members are secured to the gland in any suitable manner such as by welding and are disposed at substantially diametrically opposite points relative to shaft 12. More particularly, in the preferred embodiment abutment members 34 are disposed so that pressure members or fingers, 35 formed on yoke 18 engage the outer face of gland 16 at diametrically opposed points equally spaced from the center of shaft 12. Gland 16 also carries an outwardly extending handle 36, which in the embodiment shown is formed of a generally U-shaped rod welded or otherwise secured to the outer face of gland 16 as at 37. Arm 38 of the handle is adapted to be received within an opening 40 provided in the outer face of ring 25.

Yoke 18 comprises two arms 41—41 formed of steel bars or other suitable material and configurated so that their open ends 42 are spaced apart a distance appreciably greater than the diameter of shaft 12. The opposite ends of arms 41 are joined together by braces 43 and 44 to form a mounting leg segment designated generally at 45. The extreme outer ends of arms 41 are turned outwardly as at 46 to provide camming surfaces for spreading the arms around abutment members 34 when the yoke is brought into engagement with the gland, as best shown in Figure 3. Arms 41 carry inwardly extending pressure fingers 35, having rounded inner ends adapted for engagement with the outer face of gland 16. The fingers are welded or otherwise secured to the inner surfaces of the arms. An operating handle 47, for removing yoke 18 from engagement with mounting bracket 48, is secured to mounting leg 45 of the yoke. This end of the yoke also carries an elongated spring element 49 which is secured to the yoke in any suitable manner such as by means of bolts 50 threadably engaging cross brace 44. The outer end of spring arm 49 carries pressure adjusting bolt 51. This bolt passes through an opening provided in spring arm 49 and threadably engages locking nuts 52 and 53 and clamping nut 54 disposed on opposite sides of the spring arm. As best shown in Figures 2 and 4 one end of the bolt is adapted for abutment with end wall 14 of the mixer bowl whereby the bolt is effective to urge the end of spring arm 49 outwardly.

Figure 4:
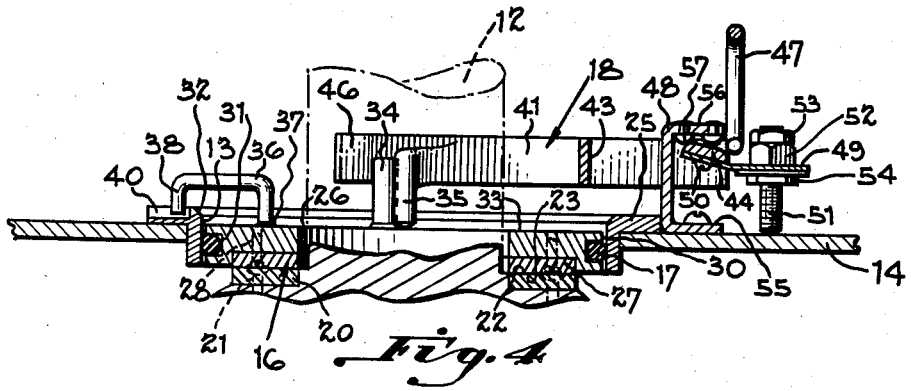
Figure 4 is a cross-sectional view taken along line 4—4 of Figure 3.

When in its assembled position yoke 18 is supported by mounting bracket 48 as shown in Figures 2, 3, and 4. This mounting bracket is constituted by a U-shaped length of steel bar including one leg 55 which is bolted or otherwise secured to end wall 14 of the mixer. The second leg 56 of the U extends parallel to the mixer wall and is spaced therefrom. This leg carries two abutment elements such as circular projections 57 which are welded, riveted, bolted or otherwise secured to leg 56. Abutment elements, or projections 57, and pressure adjusting bolt 51 are disposed along a radial line from the center of shaft 12 when the yoke is assembled. As best shown in Figure 3, this radial line extends at right angles to the diametrical line joining fingers 35.

When gland 16 is seated within aperture 13 of wall 14, bearing surface 23 of the gland is in abutting fluid tight relationship with abutment surface 22 formed on the plate 20. The cooperative engagement of these elements prevents fluid from flowing outwardly along agitator shaft 12. Fluid is prevented from escaping around the periphery of gland 16 by packing 17 which is compressed between the gland and ring 25 mounted in the end wall. It will be understood that gland 16 is held stationary within opening 13 by the engagement of pins 34 and pressure fingers 35 carried by the yoke. Consequently rotatory sealing contact is established between faces 22 and 23 while a stationary seal is established by O ring 17.

The axial thrust for establishing a pressure contact between the gland and the bearing surface on the agitator is provided by the yoke assembly which bears against the outer face of the gland through fingers 35, in engagement with the gland at two diametrically opposed points. Fingers 35 are urged inwardly by the force exerted on spring 49 by adjusting bolt 51 which causes the yoke to pivot about protuberances 57. When initially adjusting the seal, bolt 51 is threaded inwardly increasing the pressure on spring 49, until a sufficient force to provide an effective seal is applied to gland 16 through fingers 35.

The construction of yoke 18 and bracket 17 is such that gland 16 can move universally relative to the abutment surface 22 of the agitator. Consequently, the gland is effective to accommodate any misalignment, or bending of shaft 12 which may occur as an incident to the rotation of the shaft. Furthermore when in sealing engagement with the agitator and wall 13, gland 16 is still free to move relative to the wall to insure a fluid tight seal under all conditions including maximum deflection of shaft 12 resulting from peak load conditions.

When it is desired to clean the stuffing box, shaft 12, the inner surface of mixing bowl wall 14, and outer end of agitator 11, an operator can readily remove the yoke and gland from contact with the wall by pulling outwardly on handle 47, to the right in Figures 3 and 4. This causes brace 44 to become disengaged from protuberances 57 formed on bracket 48 and permits the yoke to be lifted completely free of the mixer. The operator then grasps handle 36 on gland 16 and pulls outwardly along shaft 12 to withdraw gland 16 from opening 13. The gland can be shifted along the shaft to a position shown in Figure 1 in which it is removed a substantial distance from wall 14. The operator can then easily clean the gland and can insert his hand into opening 13 to clean the inner surface of wall 14, the surrounding areas of agitator 11, ring 25, and the inner portion of shaft 12, to insure maximum cleanliness and full compliance with the most rigid sanitary codes.

After the mixer has been thoroughly cleaned, gland 16 is shifted inwardly along shaft 12 to a position in which it is received within opening 13. The arms 35 of yoke 18 are then shifted inwardly over shaft 12 until angulated segments 41 of the arms engage abutment pins 34. This causes the arms to spread slightly insuring firm engagement between pins 34 and fingers 35 when the yoke has been shifted to its final clamping position. In the meantime cross piece 44 is slipped beneath leg 56 of bracket 48 so that the cross piece engages protuberances 57 on that arm. As shown in Figure 4 this cross piece 44 is preferably angulated slightly so that when in engagement with protuberances 57 it resists outward radial movement of the yoke during operation of the mixer. Inward radial movement of yoke 18 is limited by the engagement of abutment members 34 and fingers 35, the cooperative engagement of these members insuring that fingers 35 contact gland 16 at diametrically opposite points.

It will be appreciated that the adjustment of pressure bolt 51 is not disturbed when the yoke is removed; and the entire operation of removing the yoke and gland and replacing these elements after the mixer has been cleaned requires no tools. Consequently this operation can be performed by even mechanically unskilled labor in a minimum amount of time.

Having described my invention, I claim:

1. A seal for an opening in a wall surrounding a shaft of substantially smaller diameter than the opening, said seal comprising an annular gland having a central opening surrounding said shaft in spaced relationship therewith, the outer periphery of said gland being adapted to reside within said wall opening, said outer periphery being provided with a groove, an O ring mounted in said groove and adapted to be compressed between said wall and the gland, said gland having an inwardly facing bearing surface adapted for engagement with a rotatable abutment element extending radially from said shaft, means for positioning said gland within said opening and urging it inwardly along said shaft, said means comprising a yoke having two spaced arms, each of said arms carrying an inwardly facing finger adapted for engagement with the gland at substantially diametrically opposite points thereof, a mounting bracket disposed upon said wall, said yoke including a leg portion adapted for engagement with said bracket, a spring arm extending outwardly from said leg portion and carrying an adjustable abutment member adapted for engagement with said wall to force the outer end of said spring arm outwardly, whereby said yoke is pivoted about said bracket to urge said fingers against said gland.

2. A seal for an opening in a wall surrounding a shaft of substantially smaller diameter than the opening, said seal comprising an annular gland having a central opening surrounding said shaft in spaced relationship therewith, the outer periphery of said gland being adapted to reside within said wall opening, said outer periphery being provided with a groove, an O ring mounted in said groove and adapted to be compressed between said wall and the gland, said gland having an inwardly facing bearing surface adapted for engagement with a rotatable abutment element extending radially from said shaft, means for positioning said gland within said opening and urging it inwardly along said shaft, said means comprising a yoke having two spaced arms, each of said arms carrying an inwardly facing finger adapted for engagement with the gland, abutment members carried by said gland and being adapted for engagement with said fingers to prevent rotation of said gland, said abutment members being disposed at substantially diametrically opposite points on said gland, a mounting bracket disposed upon said wall, said yoke including a leg portion adapted for engagement with said bracket, a spring arm extending outwardly from said leg portion and carrying an adjustable pressure member adapted for engagement with said wall to force the outer end of said spring arm outwardly, whereby said yoke is pivoted about said bracket to urge said fingers against said gland.

3. A seal for an opening in a wall surrounding a shaft of substantially smaller diameter than the opening, said seal comprising an annular gland having a central opening surrounding said shaft in spaced relationship therewith, the outer periphery of said gland being adapted to reside within said wall opening, said outer periphery being provided with a groove, an O ring mounted in said groove and adapted to be compressed between said wall and the gland, said gland having an inwardly facing bearing surface adapted for engagement with a rotatable abutment element extending radially from said shaft, means for positioning said gland within said opening and urging it inwardly along said shaft, said means comprising a yoke having two spaced arms, each of said arms carrying an inwardly facing finger adapted for engagement with the gland, abutment members carried by said gland and being adapted for engagement with said fingers, said abutment members being disposed at substantially diametrically opposite points on said gland, a mounting bracket disposed upon said wall, said mounting bracket including a leg spaced from said wall and carrying a projection thereon, said yoke including a leg portion adapted for engagement with the projection on said bracket, a spring arm extending outwardly from said yoke and carrying an adjustable pressure member adapted for engagement with said wall to force the outer end of said spring arm outwardly, whereby said yoke is pivoted about said bracket to urge said fingers against said gland, said pressure member and projection being disposed at right angles to the diametral line passing through said abutment members carried by said gland.

4. A seal for a wall opening surrounding a rotary shaft of subtantially smaller diameter than the opening, said seal comprising an annular gland having a central opening surrounding said shaft in spaced relationship therewith, the outer periphery of said gland being adapted to reside within the said wall opening, gasket material disposed intermediate said gland and said wall, said gland being provided with an inwardly facing bearing surface adapted for engagement with a rotatable element extending radially from said shaft, means for maintaining said gland within said wall opening, said means comprising a yoke in engagement with the said gland, a bracket mounted upon said wall, said yoke being in slidable engagement with said bracket, and spring means asociated with said yoke for pivoting said yoke relative to said bracket and urging said yoke into engagement with said gland.

5. A seal for a wall opening surrounding a rotary shaft of substantially smaller diameter than the opening, said seal comprising an annular gland having a central opening surrounding said shaft in spaced relationship therewith, the outer periphery of said gland being adapted to reside within the said wall opening, gasket material disposed intermediate said gland and said wall, said gland being provided with an inwardly facing bearing surface adapted for engagement with a rotatable element extending radially from said shaft, means for maintaining said gland within said wall opening, said means comprising a yoke in engagement with the said gland, a bracket mounted upon said wall, and including a portion spaced therefrom, said yoke being in slidable engagement with said portion of the bracket, and spring means associated with said yoke on the side of the bracket remote from the gland for pivoting said yoke relative to said bracket and urging said yoke into engagement with said gland.

6. A seal for a wall opening surrounding a rotary shaft of substantially smaller diameter than the opening, said seal comprising an annular gland having a central opening surrounding said shaft in spaced relationship therewith, the outer periphery of said gland being adapted to reside within the said wall opening, gasket material disposed intermediate said gland and said wall, said gland being provided with an inwardly facing bearing surface adapted for engagement with a rotatable element extending radially from said shaft, means for maintaining said gland within said wall opening, said means comprising a yoke having arms in engagement with the said gland, at spaced points thereof, a bracket mounted upon said wall and including a portion spaced therefrom, said yoke being in slidable engagement with said portion of the bracket, a leg portion of said yoke extending beyond said bracket, a member in engagement with said leg portion of the yoke and the wall for urging said leg portion away from the wall whereby said yoke pivots relative to said bracket and said yoke arms are forced into engagement with said gland.

References Cited in the file of this patent

UNITED STATES PATENTS

| | | |
|---|---|---|
| 1,273,648 | Machenius | July 23, 1918 |
| 1,552,666 | Banbury | Sept. 8, 1925 |
| 1,678,194 | Notz et al. | July 24, 1928 |
| 2,096,899 | Hornschuch | Oct. 26, 1937 |
| 2,285,007 | Brennan et al. | June 2, 1942 |
| 2,649,317 | Leuze | Aug. 18, 1953 |